(12) United States Patent
Hsu et al.

(10) Patent No.: US 11,416,039 B2
(45) Date of Patent: Aug. 16, 2022

(54) COMPLEX MOVING/ROTATING PIVOT SHAFT DEVICE

(71) Applicant: FIRST DOME CORPORATION, New Taipei (TW)

(72) Inventors: An Szu Hsu, New Taipei (TW); Way Han Dai, New Taipei (TW); Chr Chi Liu, New Taipei (TW)

(73) Assignee: Fositek Corp., New Taipei (TW)

( * ) Notice: Subject to any disclaimer, the term of this patent is extended or adjusted under 35 U.S.C. 154(b) by 0 days.

(21) Appl. No.: 16/895,055

(22) Filed: Jun. 8, 2020

(65) Prior Publication Data
US 2021/0381289 A1 Dec. 9, 2021

(51) Int. Cl.
*G06F 1/16* (2006.01)
*E05D 3/18* (2006.01)

(52) U.S. Cl.
CPC .............. *G06F 1/1681* (2013.01); *E05D 3/18* (2013.01); *E05Y 2900/606* (2013.01)

(58) Field of Classification Search
CPC ....... E05D 3/18; E05D 1/04; E05D 2001/045; G06F 1/1681; G06F 1/1652; G06F 1/1618
USPC .......................................................... 16/229
See application file for complete search history.

(56) References Cited

U.S. PATENT DOCUMENTS

| | | | |
|---|---|---|---|
| 93,402 A * | 8/1869 | Blake | E05D 1/04 16/355 |
| 375,394 A * | 12/1887 | Strachan | E05D 1/04 16/355 |
| 457,824 A * | 8/1891 | Curtis | E05D 1/04 16/355 |
| 2,770,834 A * | 11/1956 | Jannace | E05D 1/04 16/250 |
| 5,107,401 A * | 4/1992 | Youn | H01M 50/20 361/679.44 |
| 7,380,314 B2 * | 6/2008 | Hung | E05D 3/10 16/229 |
| 9,003,606 B2 * | 4/2015 | Hsu | H04M 1/022 16/366 |
| 9,366,064 B1 * | 6/2016 | Chen | E05F 1/12 |
| 9,404,298 B1 * | 8/2016 | Chen | G06F 1/1681 |
| 9,447,620 B2 * | 9/2016 | Park | E05D 11/1064 |
| 9,512,655 B2 * | 12/2016 | Kuo | E05D 1/04 |
| 9,677,308 B1 * | 6/2017 | Chen | G06F 1/1681 |
| 9,841,789 B2 * | 12/2017 | Lin | G06F 1/1615 |
| 9,939,851 B2 * | 4/2018 | Lan | E05D 7/12 |
| 10,066,429 B2 * | 9/2018 | Park | G06F 1/166 |
| 10,287,808 B2 * | 5/2019 | Zhang | E05D 3/18 |
| 10,309,137 B2 * | 6/2019 | Wu | E05D 11/10 |

(Continued)

*Primary Examiner* — Jeffrey O'Brien
(74) *Attorney, Agent, or Firm* — Rosenberg, Klein & Lee

(57) ABSTRACT

A complex moving/rotating pivot shaft device is applicable to a double-screen or flexible screen to minify the assembling/moving space of the components. The complex moving/rotating pivot shaft device includes an assembly of a fixing seat and a moving module. The moving module includes an operation arm, a guide section disposed on the operation arm and a bridge unit disposed between the operation arm and the fixing seat. The bridge unit has a shaft pillar, a reciprocally movable bolt and a guiding section in cooperation with the guide section, whereby the operation arm can move along the guiding section to reach a set position. Thereafter, the operation arm can rotate around the shaft pillar of the bridge unit to achieve opening/closing effect.

20 Claims, 8 Drawing Sheets

(56) References Cited

U.S. PATENT DOCUMENTS

| | | | |
|---|---|---|---|
| 10,429,896 B2* | 10/2019 | Kuramochi | G06F 1/1681 |
| 2011/0304983 A1* | 12/2011 | Senatori | G06F 1/1681 |
| | | | 361/679.55 |
| 2013/0002114 A1* | 1/2013 | Hamers | G06F 1/1679 |
| | | | 312/319.5 |
| 2017/0257961 A1* | 9/2017 | Chen | E05D 11/105 |
| 2020/0409429 A1* | 12/2020 | Hsu | G06F 1/1652 |
| 2021/0029232 A1* | 1/2021 | Park | E05D 3/06 |
| 2021/0034108 A1* | 2/2021 | Liao | H04M 1/0247 |
| 2021/0041921 A1* | 2/2021 | Kang | G06F 1/1652 |

\* cited by examiner

COMPLEX MOVING/ROTATING PIVOT SHAFT DEVICE

BACKGROUND OF THE INVENTION

1. Field of the Invention

The present invention relates generally to a pivot shaft device, and more particularly to a complex moving/rotating pivot shaft device in which the operation arm of the pivot shaft can be moved and rotated at the same time to reduce the assembling/moving space of the components.

2. Description of the Related Art

There are various electronic apparatuses provided with covers or display screens, such as mobile phones, notebooks, PDA and electronic books. The covers or display screens are pivotally mounted on the electronic apparatuses via pivot shafts or rotary shafts, whereby the covers or the display screens can be freely rotated and opened/closed under external force. For example, Taiwanese Patent No. 97222022 discloses a rotary shaft structure and Taiwanese Patent No. 98207366 discloses a pivot shaft structure. These are typical examples.

In order to operate the display module (such as the screen) and/or the apparatus body module of the electronic apparatus in more operation modes to widen the application range thereof, a conventional dual-shaft mechanism mounted between the display module and the apparatus body module has been developed to rotate the display module and/or the apparatus body module by different angles in accordance with different operation modes. For example, Taiwanese Patent No. 99211350 discloses a dual-shaft hinge device, Taiwanese Patent No. 99225737 discloses a biaxial hinge device and U.S. Pat. No. 7,512,426 B2 discloses a mobile communications device with synchronizing hinge. These are typical examples.

With respect to the operation and structural design of such pivot shaft assembly assembled with a flexible screen, in practice, at least one set of dual-shaft mechanism must be employed in cooperation with the displacement of the rotary shafts so as to provide bending operation space for the flexible screen. For example, Taiwanese Patent No. 105126016 discloses a pivot shaft device with displaceable shaft. Taiwanese Patent No. 107134205 discloses a rotary shaft module of foldable device. Taiwanese Patent No. 108207352 discloses a dual-shaft synchronously movable hinge with eccentric rotation. These are typical examples.

A conventional technique and structure has also been disclosed that an assembly of multiple rotary shafts, links, gears (or spiral gears and/or racks), link plates and connection components is employed to transmit power and make the dual-shaft mechanism synchronously rotate.

However, as well known by those who are skilled in this field, in consideration that the electronic apparatus must meet the requirement for lightweight and thin (or simplified) structure, the conventional pivot shaft device or the relevant connection components have complicated structure and cooperation form. Moreover, when the flexible screen is bent and folded or unfolded, the dual-shaft mechanism or the pivot shaft device has larger volume and occupies larger displacement (moving) space. This is not what we expect.

To speak representatively, the conventional rotary shaft or pivot shaft structure and the relevant connection components thereof have some shortcomings in use and structural design. The rotary shaft structure and the relevant components can be redesigned to eliminate these shortcomings. For example, in condition that the requirements for lightweight and thin structure and easy assembly of the electronic apparatus are satisfied, the pivot shaft structure and the relevant connection components are applicable to double-screen or flexible screen to bend and fold/unfold the screen. Furthermore, the cooperative gaps or motional ranges between the pivot shaft device and the components are as minified as possible. In this case, the entire electronic apparatus can be designed with a simplified structure and beautiful appearance to improve the shortcoming of the conventional rotary shaft structure that the components have larger volume and occupy larger (moving) space. Therefore, the shortcomings of the conventional pivot shaft device can be eliminated. Also, the structure and the use form of the conventional pivot shaft device can be changed to widen the application range thereof. None of the above issues is specifically taught or disclosed in the above references.

SUMMARY OF THE INVENTION

It is therefore a primary object of the present invention to provide a complex moving/rotating pivot shaft device, which is applicable to a double-screen or flexible screen to minify the assembling/moving space of the components. The complex moving/rotating pivot shaft device includes an assembly of a fixing seat and a moving module. The moving module includes an operation arm, a guide section disposed on the operation arm and a bridge unit disposed between the operation arm and the fixing seat. The bridge unit has a shaft pillar, a reciprocally movable bolt and a guiding section in cooperation with the guide section, whereby the operation arm can move along the guiding section to reach a set position. Thereafter, the operation arm can rotate around the shaft pillar of the bridge unit to achieve opening/closing effect.

In the above complex moving/rotating pivot shaft device, the guide section of the operation arm has the form of an (arched) rail. A cavity is disposed at one end of the guide section and a slope is connected with the cavity. The fixing seat is formed with a dent and a slope connected with the dent, whereby the bolt of the bridge unit is permitted to move between the cavity and the slope of the operation arm and the dent and the slope of the fixing seat so as to control the moving and/or rotating of the operation arm.

The present invention can be best understood through the following description and accompanying drawings, wherein:

DETAILED DESCRIPTION OF THE PREFERRED EMBODIMENTS

Figure 1:
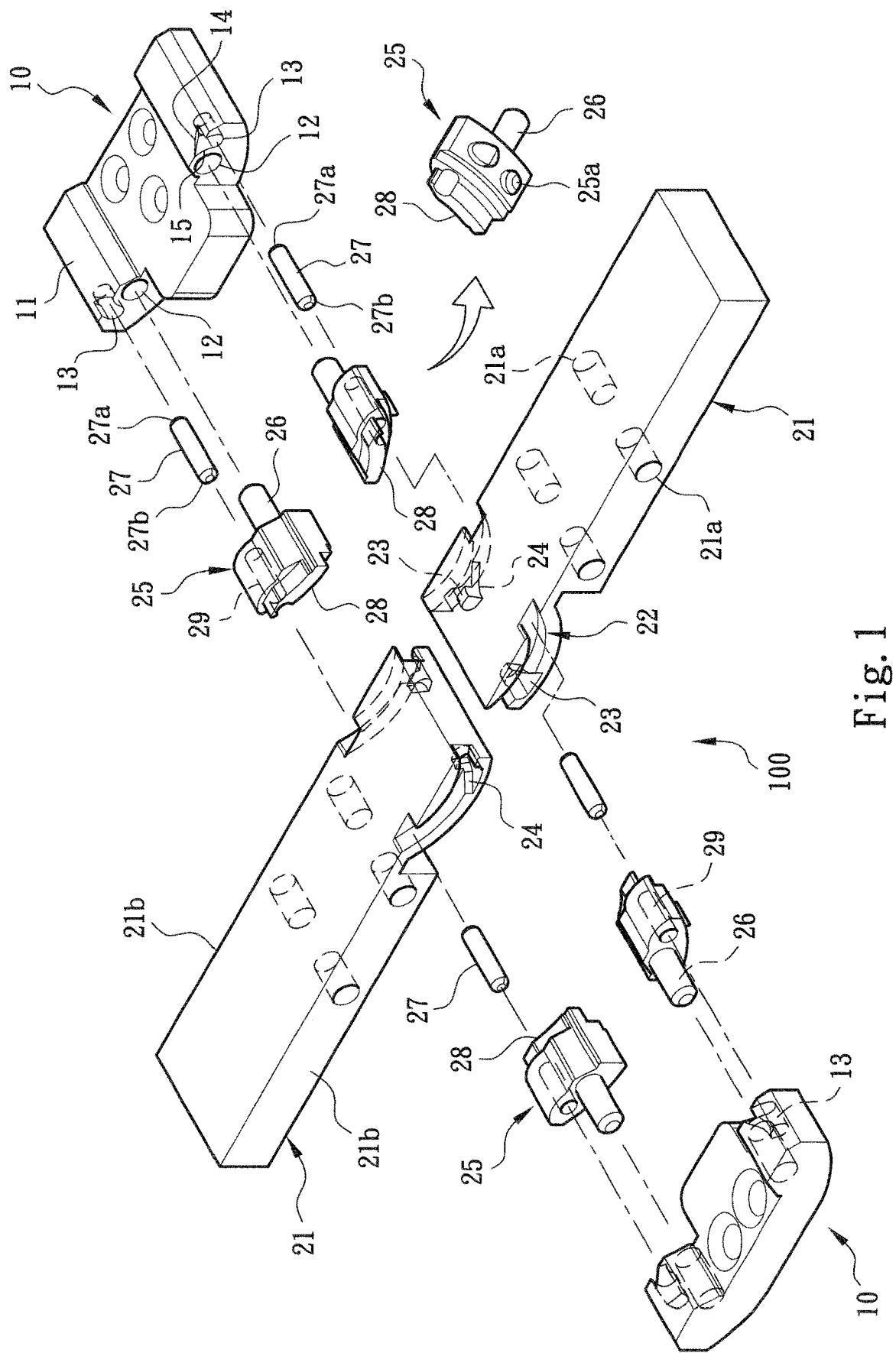
FIG. 1 is a perspective exploded view of the pivot shaft device of the present invention, showing the structures of the operation arm, the fixing seat and the bridge unit.

Please refer to FIG. 1. The complex moving/rotating pivot shaft device of the present invention includes a fixing seat 10 and a moving module 20. The fixing seat 10 and the moving module 20 form a pivot shaft device (or an assembly 100) applied to a double-screen (case body) or flexible screen to minify the assembling/moving space of the components. In the description hereinafter, the upper section, upper side, lower section, lower side, outer section, outer side, inner section, inner side, etc. mentioned are recited with the direction of the drawings as the reference direction.

Figure 2:
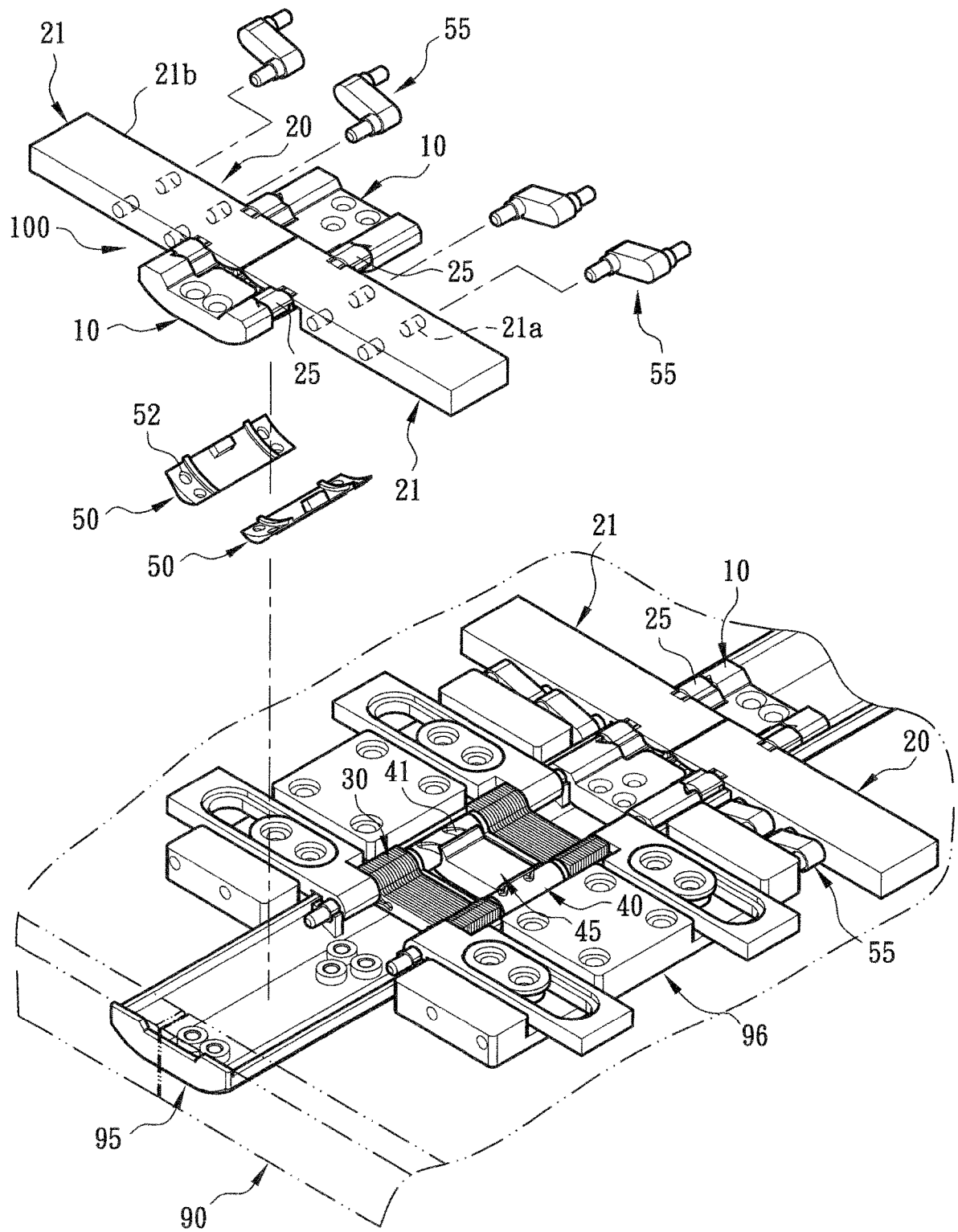
FIG. 2 is a perspective view of a preferred embodiment of the present invention, in which the phantom lines show that the pivot shaft device, the rotary shaft and the torque module are assembled with the apparatus body of an electronic apparatus.

Please refer to FIGS. 1 and 2. The fixing seat 10 is disposed on a sink seat 95. The fixing seat 10 is in the form of a block body. The fixing seat 10 has a wing section 11 and a shaft hole 12 and a dent 13 formed on the wing section 11 and a slope 14 connected with the dent 13. The slope 14 is a triangular structure and expanded in a direction to the opening of the dent 13. The slope 14 is connected with a guide face 15.

In this embodiment, the moving module 20 includes an operation arm 21, a guide section 22 disposed on the operation arm 21 and a bridge unit 25 disposed between the operation arm 21 and the fixing seat 10.

To speak more specifically, two sides of one end of the operation arm 21 are respectively formed with two guide sections 22. The guide section 22 has the form of an arched recessed rail structure (or arched raised rail structure). A tail end section of the guide section 22 is formed with a cavity 23 and a slope 24 connected with the cavity 23.

As shown in the drawings, the bridge unit 25 has a shaft pillar 26, a reciprocally movable bolt 27 and a guiding section 28 in cooperation with the guide section 22. The operation arm 21 is permitted to move along the guiding section 28, whereby the bolt 27 of the bridge unit 25 can move between the cavity 23 and the slope 24 of the operation arm 21 and the dent 13 and the slope 14 of the fixing seat 10 so as to control the moving and/or rotating of the operation arm 21. In addition, after the operation arm 21 reaches a set position, the operation arm 21 can rotate around the shaft pillar 27 of the bridge unit 25 so as to open or close (the operation arm 21).

In this embodiment, the shaft pillar 26 of bridge unit 25 is assembled in the shaft hole 12 of the fixing seat 10, whereby the bridge unit 25 can freely rotate. The bridge unit 25 is formed with a bolt hole 29 for receiving the bolt 27, whereby the bolt 27 can freely move within the bolt hole 29. The guiding section 28 of the bridge unit 25 has the form of an arched raised rail structure (or arched recessed rail structure) for correspondingly assembling with the guide section 22 of the operation arm 21.

As shown in FIGS. 1 and 2, the bridge unit 25 is formed with an assembling section 25a. The assembling section 25a has the form of a raised structure (or a recessed structure), whereby the bridge unit 25 can be assembled and connected with an aid board 50 to enhance the stability of the bridge unit 25 in moving. The aid board 50 is formed with an assembled section 52 has the form of a recessed structure (or a raised structure) corresponding to the assembling section 25a in the form of a raised structure (or a recessed structure).

Please refer to FIG. 2. In a preferred embodiment, the fixing seat 10 and the moving module 20 form the assembly 100, which can be assembled with double rotary shafts 40, the spiral groove 41 formed on the rotary shaft 40 and the (synchronous) guide block 45 disposed between the double rotary shafts 40 so as to achieve the effect that the double rotary shafts 40 (or the apparatus body 90) are synchronously rotated or moved.

For example, the operation arm 21 is formed with at least one or multiple holes 21a for pivotally connecting with a link section 55. One end of the link section 55 is pivotally connected with the hole 21a of the operation arm 21, while the other end is pivotally connected with a slide section 96. The slide section 96 and the operation arm 21 can be secured on the apparatus body 90 of the electronic apparatus, whereby when a user operates the apparatus body 90, the slide section 96 and the operation arm 21 (or the assembly 100) is moved along with the apparatus body 90 to open or close the apparatus body 90.

Figure 3:
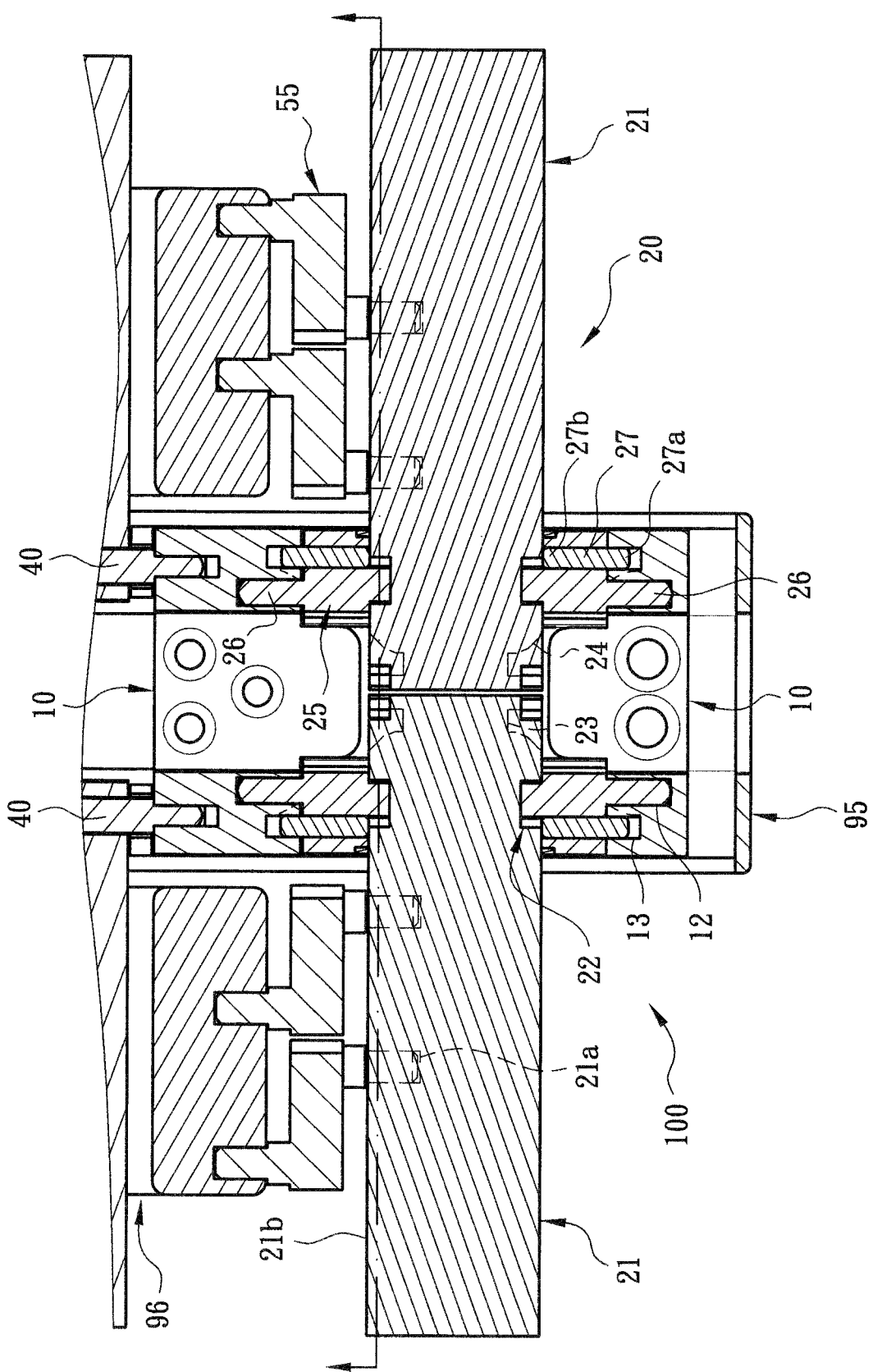
FIG. 3 is a plane view of the present invention, showing that the operation arm is positioned in a 180-degree position (or opened position of the apparatus body)
Figure 4:
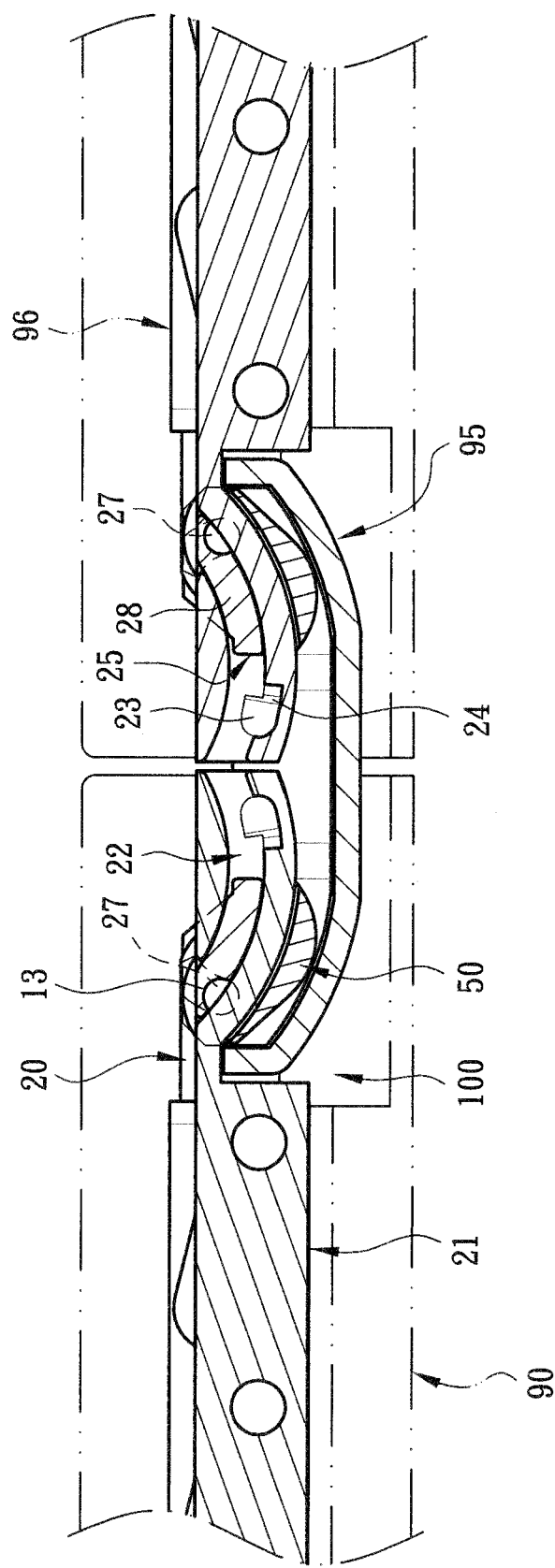
FIG. 4 is a sectional view according to FIG. 3, showing the position of the bolt of the bridge unit.

Please refer to FIGS. 3 and 4, which show that the operation arm 21 is positioned in a 180-degree position (or an opened position of the apparatus body 90). FIG. 4 shows the position of the bolt 27 of the bridge unit 25. One end of the bolt 27 is positioned in the dent 13 of the fixing seat 10, while the other end abuts against the sidewall 21b of the operation arm 21. In order to facilitate the description, the end of the bolt 27 positioned in the dent 13 of the fixing seat is defined as a first end 27a, while the other end of the bolt 27 is defined as a second end 27b.

Figure 5:
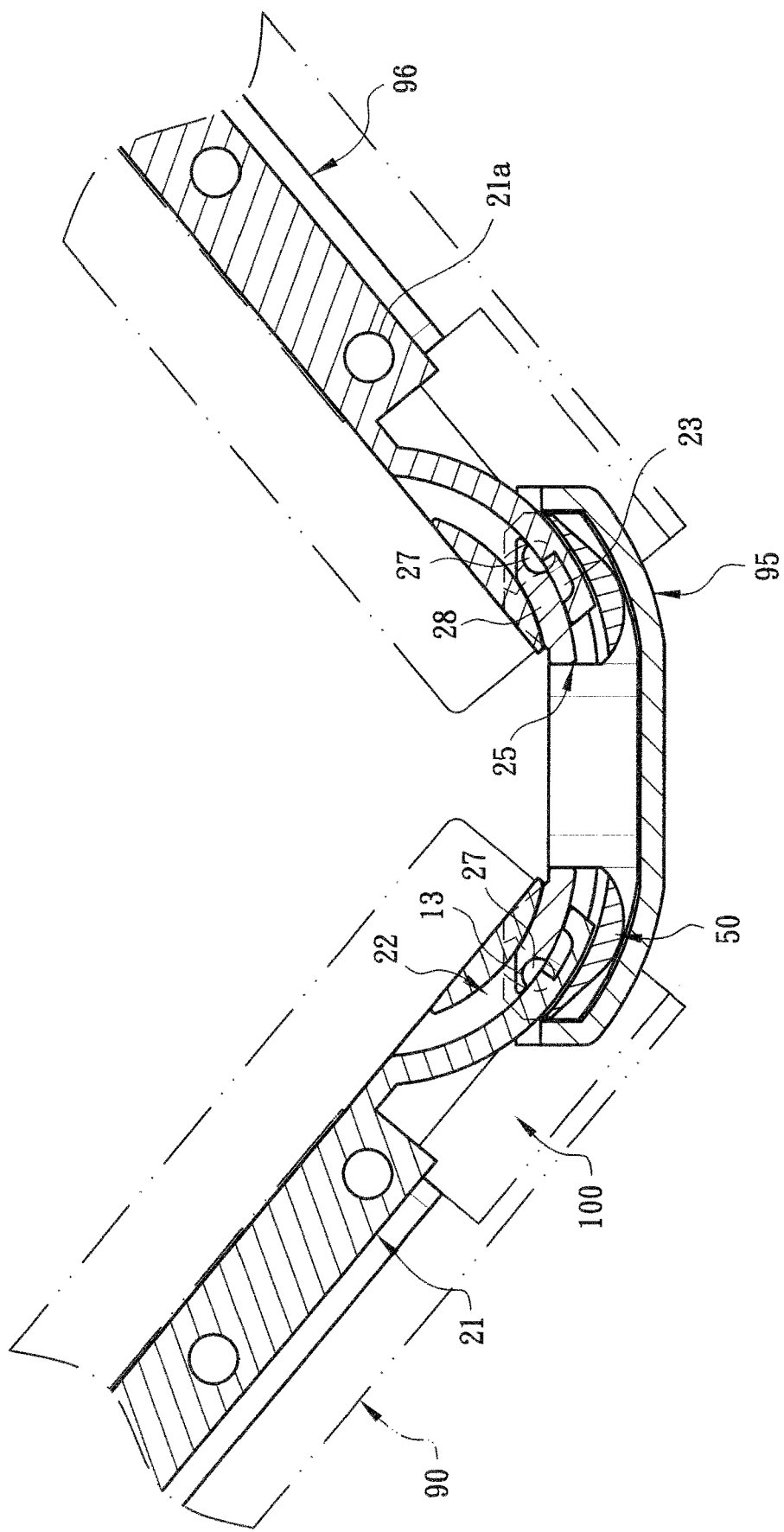
FIG. 5 is a sectional view of the present invention, showing an operation of the present invention and the position of the bolt, in which the operation arm is positioned in a 100-degree position (or a 110-degree position)

Please now refer to FIG. 5. When a user operates or pulls the operation arm 21 (or the apparatus body 90), the (arched) guide section 22 of the operation arm 21 relatively moves along the (arched) guiding section 28 of the bridge unit 25. Accordingly, the operation arm 21 moves (and/or moves and rotates) from the 180-degree position to a 100-degree position (or a 110-degree position) around a virtual axis. At the same time, the bolt 27 gradually gets closer to and/or reaches the slope 24 of the operation arm 21.

It should be noted that the guide section 22 of the operation arm 21 moves along the guiding section 28 of the bridge unit 25 to two lateral sides (or outer sides) of the assembly 100. This system relatively helps in increasing the space for receiving the bent section of the flexible screen.

When the user further operates the operation arm 21 to move to the closed position, a force is applied to the first end 27a of the bolt 27 to push the fixing seat 10, whereby the fixing seat 10 pushes the bolt 27 in a reverse direction to move in an axial direction (the axial direction means the axial direction of the bolt 27) (along the guide face 15). Relatively, the second end 27b of the bolt 27 moves along the slope 24 of the operation arm 21 to gradually get closer to the cavity 23 of the operation arm 21. Therefore, it can be understood that the slope 24 is inclined from the sidewall 21b of the operation arm 21 toward the cavity 23 (or the interior of the operation arm 21) so that the second end 27b of the bolt 27 can easily get into the cavity 23 of the operation arm 21.

Figure 6:
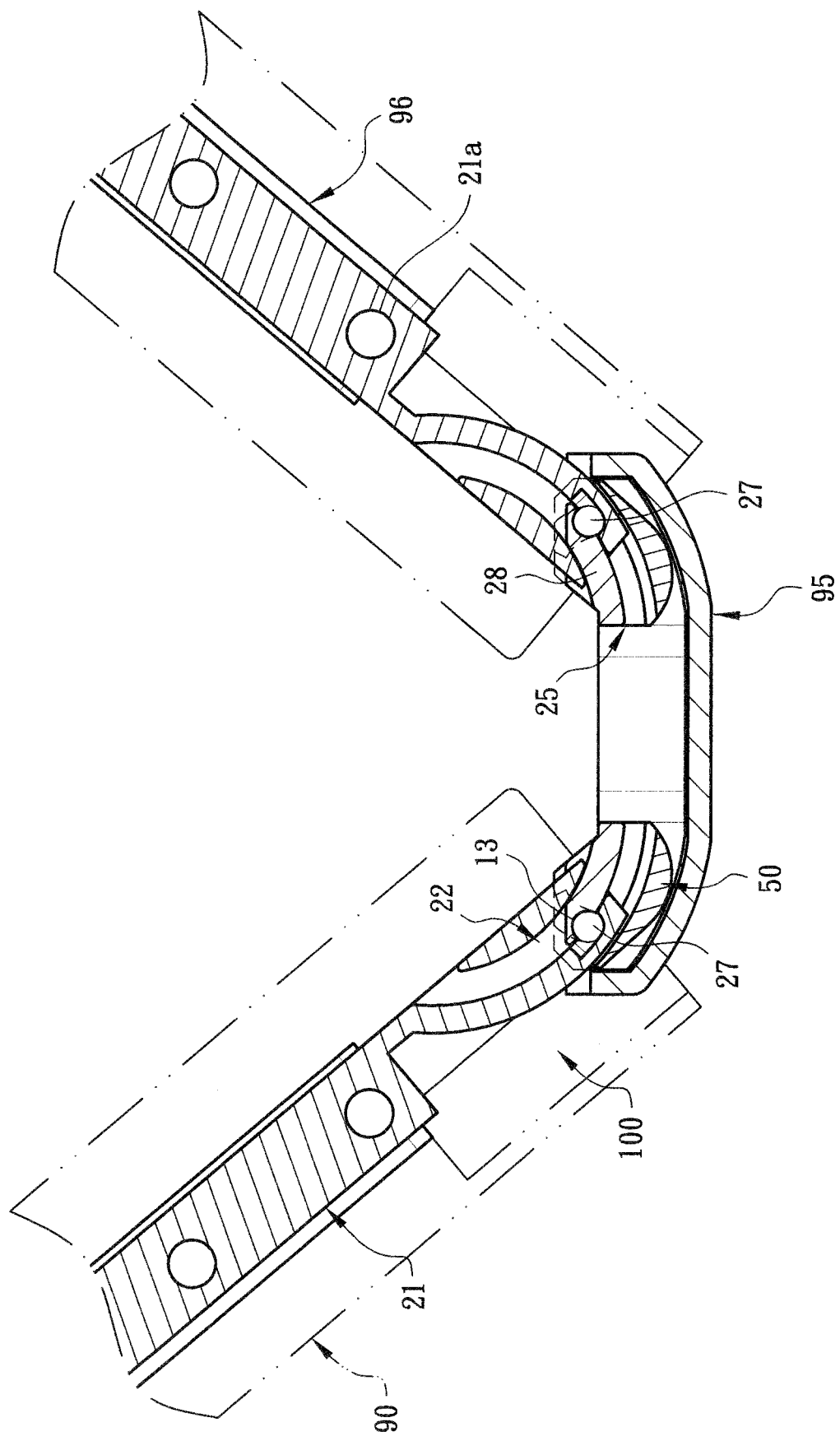
FIG. 6 is a sectional view of the present invention, showing another operation of the present invention and the position of the bolt, in which the operation arm is positioned in an 80-degree position.

Please now refer to FIG. 6. When the user operates the operation arm 21 to reach an 80-degree position (or said set position), the first end 27a of the bolt 27 has been pushed out of the dent 13 along the slope 14 of the fixing seat, while the second end 27b of the bolt 27 reaches the cavity 23 of the operation arm 21 to be pushed into the cavity 23 of the operation arm 21. At this time, the position switching effect of the bolt 27 is completed.

Figure 7:
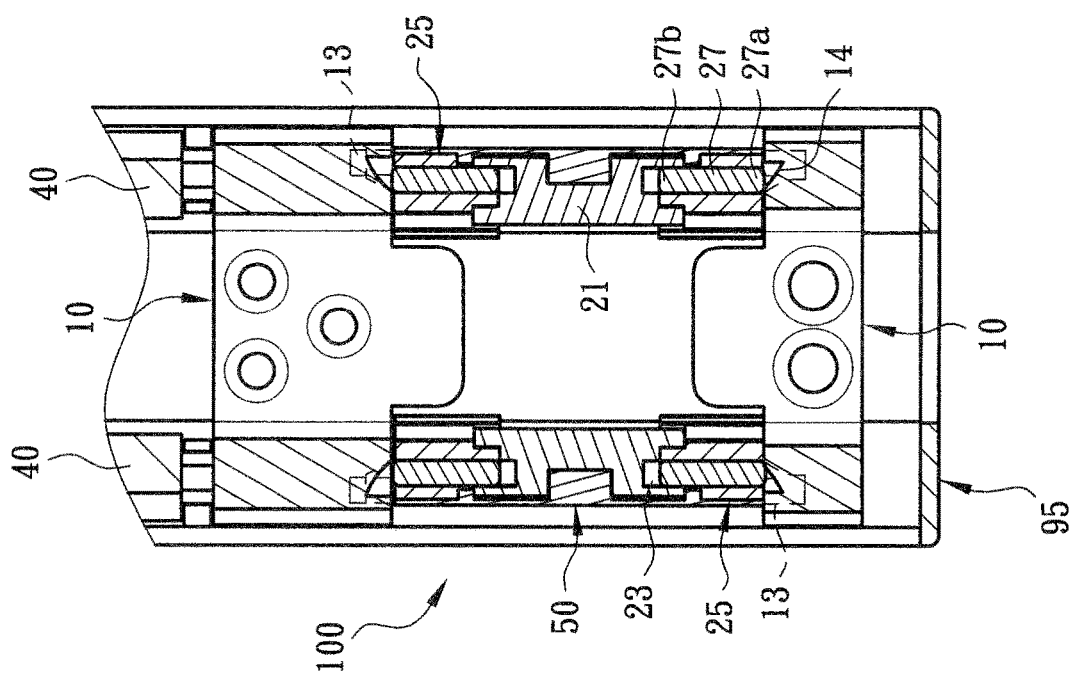
FIG. 7 is a plane view of the present invention, showing still another operation of the present invention, in which the operation arm is positioned in a 0-degree position (or closed position of the apparatus body)
Figure 8:
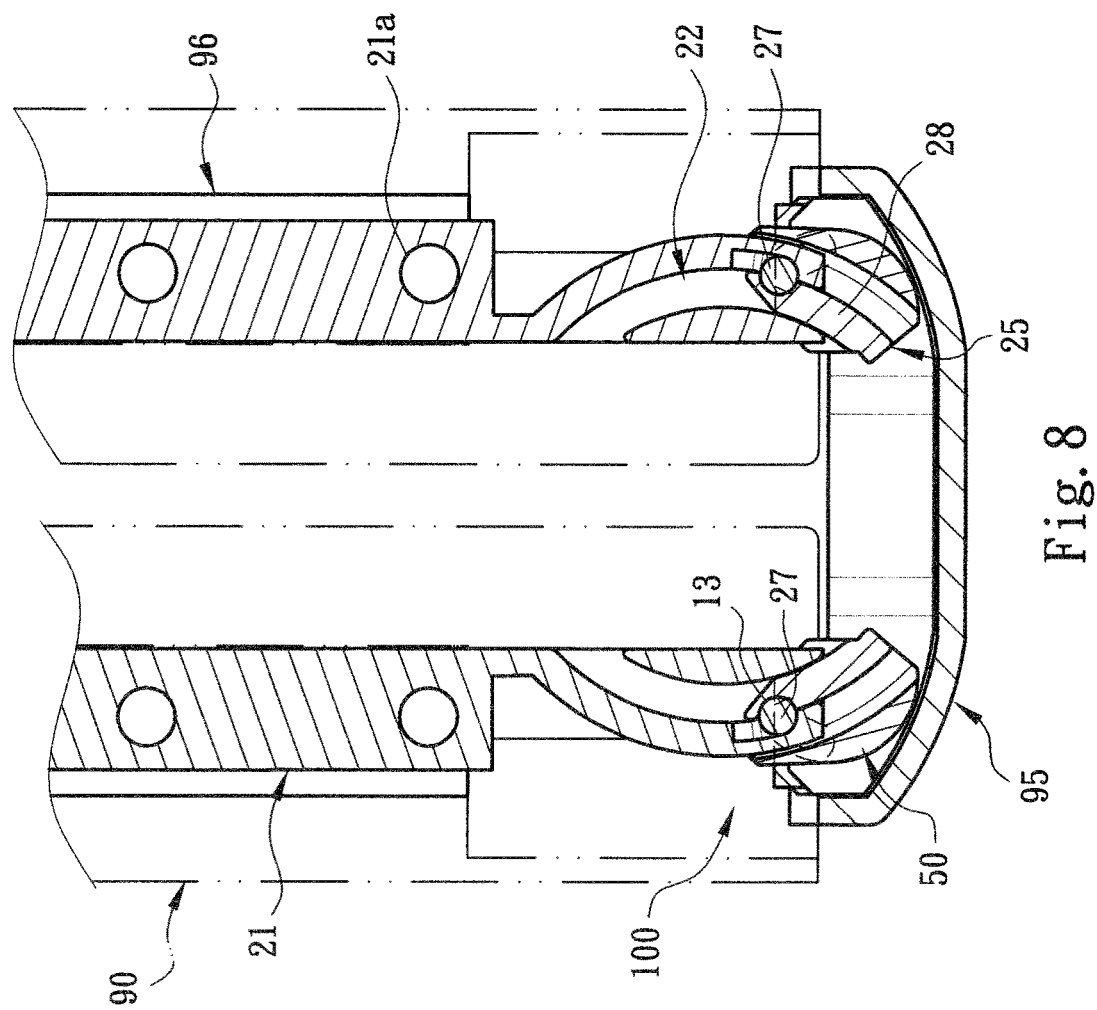
FIG. 8 is a sectional view of the present invention according to FIG. 7, showing the position of the bolt, in which the operation arm is positioned in a 0-degree position.
Figure 9:
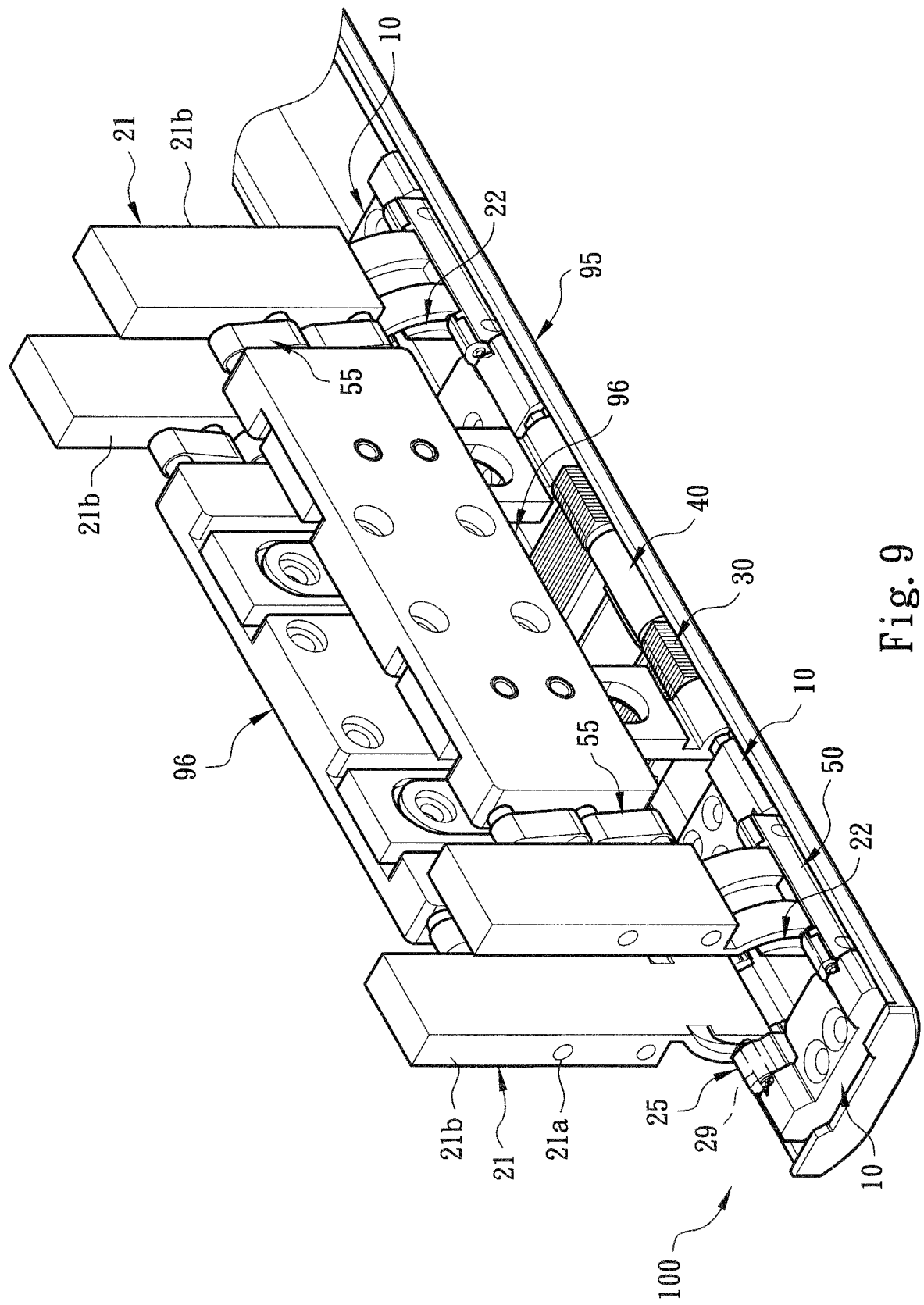
FIG. 9 is a perspective view according to FIG. 8.

Please now refer to FIGS. 7 and 8. When the user operates the operation arm 21 to move to the closed position, the shaft pillar 26 of the bridge unit 25 is pivotally connected with the shaft hole 12 of the fixing seat 10 to serve as a rotational fulcrum, whereby the operation arm 21 is permitted to be positioned in the 0-degree position (or the closed position of the apparatus body 90) as shown in FIG. 9. At this time, the operation arm 21 (or the apparatus body 90) is completely opened/closed.

To speak representatively, in the condition that that the complex moving/rotating pivot shaft device meets the requirements for lightweight and thin (or simplified) electronic apparatus, in comparison with the conventional pivot shaft device, the complex moving/rotating pivot shaft device of the present invention has the following advantages:

1. The assembling structure of the assembly 100 composed of the fixing seat 10 and the moving module 20 has been redesigned to become a rotatably and/or movable structural form, which is obviously different from the structural form of the conventional pivot shaft device. For example, the fixing seat 10 is formed with the shaft hole 12 for pivotally connecting with the shaft pillar 26 of the bridge unit 25. The operation arm 21 is formed with the guide section 22 assembled with the guiding section 28 of the bridge unit 25, whereby the operation arm 21 and the bridge unit 25 can move relative to each other. The fixing seat 10 is formed with the dent 13 and the slope 14 in cooperation with the cavity 23 and the slope 24 of the operation arm 21, whereby the bolt 27 of the bridge unit 25 is permitted to move between the operation arm 21 and the fixing seat 10 so as to control the move and/or rotation of the operation arm 21.

2. The assembling structures of the fixing seat 10 and the moving module 20 are applicable to double-screen or flexible screen for the bending unfolding/folding operation of the flexible screen. Moreover, the cooperation gap and moving range between the assembly 100 or the components are as minified as possible. In this case, the entire electronic apparatus can be designed with a simplified structure and beautiful appearance to improve the shortcoming of the conventional pivot shaft device that the components have larger volume and occupy larger (moving) space. This is obviously different from the conventional pivot shaft device in use form and widens the application range thereof.

In conclusion, the complex moving/rotating pivot shaft device of the present invention is effective and different from the conventional pivot shaft device in space form. The complex moving/rotating pivot shaft device of the present invention is inventive, greatly advanced and advantageous over the conventional rotary shaft structure.

The above embodiments are only used to illustrate the present invention, not intended to limit the scope thereof. Many modifications of the above embodiments can be made without departing from the spirit of the present invention.

What is claimed is:

1. A complex moving and rotating pivot shaft device comprising: an assembly (100) of a fixing seat (10) and a moving module (20), the fixing seat (10) being formed with a shaft hole (12) and a dent (13), the moving module (20) including an operation arm (21) having a sidewall (21b), and a first guide section (22), the first guide section (22) having a tail end section formed with a cavity (23), and a bridge unit (25) disposed between the operation arm (21) and the fixing seat (10), the bridge unit (25) having a shaft pillar (26) pivotally connecting with the shaft hole (12) of the fixing seat (10) to provide free rotation of the bridge unit (25), a reciprocally-movable bolt (27) having a first end (27a) and a second end (27b), the bridge unit (25) being formed with a bolt hole (29) for receiving the reciprocally-movable bolt (27) therein, the bridge unit (25) being formed with a guiding section (28) in cooperation with the first guide section (22), whereby the operation arm (21) is movable along the guiding section (28) to reach a set position so that the operation arm (21) is rotatable with the shaft pillar (26) of the bridge unit (25) serving as a fulcrum.

2. The complex moving and rotating pivot shaft device as claimed in claim 1, wherein the fixing seat (10) is in the form of a block body, the fixing seat (10) having a wing section (11) and the shaft hole (12) formed on the wing section (11), the dent (13) being formed on the wing section (11), a slope (24) being formed on the tail end section of the first guide section (22) and connected with the cavity (23), and a slope (14) being formed on the wing section (11) and connected with the dent (13), whereby the reciprocally-movable bolt (27) of the bridge unit (25) is movable between the cavity (23) and the slope (24) of the operation arm (21) and the dent (13) and the slope (14) of the fixing seat (10).

3. The complex moving and rotating pivot shaft device as claimed in claim 2, wherein the slope (14) of the fixing seat (10) is a triangular structure and expanded in a direction to the opening of the dent (13) of the fixing seat (10), the slope (14) being connected with a guide face (15), the slope (24) of the operation arm (21) being inclined from the sidewall (21b) of the operation arm (21) towards the cavity (23) of the operation arm.

4. The complex moving and rotating pivot shaft device as claimed in claim 1, wherein two opposing sides of one end of the operation arm (21) are, respectively, formed with the first guide section (22) and a second guide section (22), each of the first guide section (22) and second guide section (22) having the form of one of an arched recessed rail structure or an arched raised rail structure, the guiding section (28) of the bridge unit (25) having the form of one of an arched raised rail structure or an arched recessed rail structure for correspondingly assembling with the first guide section (22) and the second guide section (22) of the operation arm (21).

5. The complex moving and rotating pivot shaft device as claimed in claim 2, wherein two opposing sides of one end of the operation arm (21) are respectively formed with the first guide section (22) and a second guide section (22), each of the first guide section (22) and the second guide section (22) having the form of one of an arched recessed rail structure or an arched raised rail structure, the guiding section (28) of the bridge unit (25) having the form of one of an arched raised rail structure or an arched recessed rail structure for correspondingly assembling with the first guide section (22) and the second guide section (22) of the operation arm (21).

6. The complex moving and rotating pivot shaft device as claimed in claim 3, wherein two opposing sides of one end of the operation arm (21) are respectively formed with the first guide section (22) and a second guide section (22), each of the first guide section (22) and the second guide section (22) having the form of one of an arched recessed rail structure or an arched raised rail structure, the guiding section (28) of the bridge unit (25) having the form of one of an arched raised rail structure or an arched recessed rail structure for correspondingly assembling with the first guide section (22) and the second guide section (22) of the operation arm (21).

7. The complex moving and rotating pivot shaft device as claimed in claim 1, wherein the bridge unit (25) is formed with an assembling section (25*a*), the assembling section (25*a*) having the form of a raised structure or a recessed structure, whereby the bridge unit (25) is assembled and connected with an aid board (50), the aid board (50) being formed with an assembled section (52) having the form of a recessed structure or a raised structure corresponding to the assembling section 25*a*.

8. The complex moving and rotating pivot shaft device as claimed in claim 4, wherein the bridge unit (25) is formed with an assembling section (25*a*), the assembling section (25*a*) having the form of a raised structure or a recessed structure, whereby the bridge unit (25) is assembled and connected with an aid board (50), the aid board (50) being formed with an assembled section (52) having the form of a recessed structure or a raised structure corresponding to the assembling section 25*a*.

9. The complex moving and rotating pivot shaft device as claimed in claim 1, wherein the fixing seat (10) is disposed on a sink seat (95), the assembly (100) being assembled with double rotary shafts (40), a spiral groove (41) formed on the double rotary shafts (40) and a guide block (45) disposed between the double rotary shafts (40), the operation arm (21) being formed with at least one hole (21*a*) for pivotally connecting with a link section (55), one end of the link section (55) being pivotally connected with the at least one hole (21*a*) of the operation arm (21), while the other end being pivotally connected with a slide section (96), the slide section (96) and the operation arm (21) being secured on an apparatus body (90) of an electronic apparatus.

10. The complex moving and rotating pivot shaft device as claimed in claim 4, wherein the fixing seat (10) is disposed on a sink seat (95), the assembly (100) being assembled with double rotary shafts (40), a spiral groove (41) formed on the double rotary shafts (40) and a guide block (45) disposed between the double rotary shafts (40), the operation arm (21) being formed with at least one hole (21*a*) for pivotally connecting with a link section (55), one end of the link section (55) being pivotally connected with the at least one hole (21*a*) of the operation arm (21), while the other end being pivotally connected with a slide section (96), the slide section (96) and the operation arm (21) being secured on an apparatus body (90) of an electronic apparatus.

11. The complex moving and rotating pivot shaft device as claimed in claim 7, wherein the fixing seat (10) is disposed on a sink seat (95), the assembly (100) being assembled with double rotary shafts (40), a spiral groove (41) formed on the double rotary shafts (40) and a guide block (45) disposed between the double rotary shafts (40), the operation arm (21) being formed with at least one hole (21*a*) for pivotally connecting with a link section (55), one end of the link section (55) being pivotally connected with the at least one hole (21*a*) of the operation arm (21), while the other end being pivotally connected with a slide section (96), the slide section (96) and the operation arm (21) being secured on an apparatus body (90) of an electronic apparatus.

12. The complex moving and rotating pivot shaft device as claimed in claim 8, wherein the fixing seat (10) is disposed on a sink seat (95), the assembly (100) being assembled with double rotary shafts (40), a spiral groove (41) formed on the double rotary shafts (40) and a guide block (45) disposed between the double rotary shafts (40), the operation arm (21) being formed with at least one hole (21*a*) for pivotally connecting with a link section (55), one end of the link section (55) being pivotally connected with the at least one hole (21*a*) of the operation arm (21), while the other end being pivotally connected with a slide section (96), the slide section (96) and the operation arm (21) being secured on an apparatus body (90) of an electronic apparatus.

13. The complex moving and rotating pivot shaft device as claimed in claim 1, wherein when the operation arm (21) is displaced to an open position, the first end (27*a*) of the reciprocally-movable bolt (27) is positioned in the fixing seat (10), while the second end (27*b*) abuts against the sidewall (21*b*) of the operation arm (21), whereby the first guide section (22) of the operation arm (21) is relatively movable along the guiding section (28) of the bridge unit (25) so that the operation arm (21) moves from the open position to the set position around a virtual axis, the first end (27*a*) of the reciprocally-movable bolt (27) being displaceable from the fixing seat (10) and the second end (27*b*) being inserted into the operation arm (21) to form a rotational fulcrum in cooperation with the shaft pillar (26) to position the operation arm (21) in a closed position, the set position being intermediate the open position and the closed position.

14. The complex moving and rotating pivot shaft device as claimed in claim 4, wherein when the operation arm (21) is displaced to an open position, the first end (27*a*) of the reciprocally-movable bolt (27) is positioned in the fixing seat (10), while the second end (27*b*) abuts against the sidewall (21*b*) of the operation arm (21), whereby the first guide section (22) of the operation arm (21) is relatively movable along the guiding section (28) of the bridge unit (25) so that the operation arm (21) moves from the open position to the set position around a virtual axis, the first end (27*a*) of the reciprocally-movable bolt (27) being displaceable from the fixing seat (10) and the second end (27*b*) being inserted into the operation arm (21) to form a rotational fulcrum in cooperation with the shaft pillar (26) to position the operation arm (21) in a closed position, the set position being intermediate the open position and the closed position.

15. The complex moving and rotating pivot shaft device as claimed in claim 7, wherein when the operation arm (21) is displaced to an open position, the first end (27*a*) of the reciprocally-movable bolt (27) is positioned in the fixing seat (10), while the second end (27*b*) abuts against the sidewall (21*b*) of the operation arm (21), whereby the first guide section (22) of the operation arm (21) is relatively movable along the guiding section (28) of the bridge unit (25) so that the operation arm (21) moves from the open position to the set position around a virtual axis, the first end (27*a*) of the reciprocally-movable bolt (27) being displaceable from the fixing seat (10) and the second end (27*b*) being inserted into the operation arm (21) to form a rotational fulcrum in cooperation with the shaft pillar (26) to position the operation arm (21) in a closed position, the set position being intermediate the open position and the closed position.

16. The complex moving and rotating pivot shaft device as claimed in claim 8, wherein when the operation arm (21) is displaced to an open position, the first end (27*a*) of the reciprocally-movable bolt (27) is positioned in the fixing seat (10), while the second end (27*b*) abuts against the sidewall (21b) of the operation arm (21), whereby the first guide section (22) of the operation arm (21) is relatively movable along the guiding section (28) of the bridge unit (25) so that the operation arm (21) moves from the open position to the set position around a virtual axis, the first end (27a) of the reciprocally-movable bolt (27) being displaceable from the fixing seat (10) and the second end (27b) being inserted into the operation arm (21) to form a rotational fulcrum in cooperation with the shaft pillar (26) to position the operation arm (21) in a closed position, the set position being intermediate the open position and the closed position.

17. The complex moving and rotating pivot shaft device as claimed in claim 9, wherein when the operation arm (21) is displaced to an open position, the first end (27a) of the reciprocally-movable bolt (27) is positioned in the fixing seat (10), while the second end (27b) abuts against the sidewall (21b) of the operation arm (21), whereby the first guide section (22) of the operation arm (21) is relatively movable along the guiding section (28) of the bridge unit (25) so that the operation arm (21) moves from the open position to the set position around a virtual axis, the first end (27a) of the reciprocally-movable bolt (27) being displaceable from the fixing seat (10) and the second end (27b) being inserted into the operation arm (21) to form a rotational fulcrum in cooperation with the shaft pillar (26) to position the operation arm (21) in a closed position, the set position being intermediate the open position and the closed position.

18. The complex moving and rotating pivot shaft device as claimed in claim 10, wherein when the operation arm (21) is displaced to an open position, the first end (27a) of the reciprocally-movable bolt (27) is positioned in the fixing seat (10), while the second end (27b) abuts against the sidewall (21b) of the operation arm (21), whereby the first guide section (22) of the operation arm (21) is relatively movable along the guiding section (28) of the bridge unit (25) so that the operation arm (21) moves from the open position to the set position around a virtual axis, the first end (27a) of the reciprocally-movable bolt (27) being displaceable from the fixing seat (10) and the second end (27b) being inserted into the operation arm (21) to form a rotational fulcrum in cooperation with the shaft pillar (26) to position the operation arm (21) in a closed position, the set position being intermediate the open position and the closed position.

19. The complex moving and rotating pivot shaft device as claimed in claim 11, wherein when the operation arm (21) is displaced to an open position, the first end (27a) of the reciprocally-movable bolt (27) is positioned in the fixing seat (10), while the second end (27b) abuts against the sidewall (21b) of the operation arm (21), whereby the first guide section (22) of the operation arm (21) is relatively movable along the guiding section (28) of the bridge unit (25) so that the operation arm (21) moves from the open position to the set position around a virtual axis, the first end (27a) of the reciprocally-movable bolt (27) being displaceable from the fixing seat (10) and the second end (27b) being inserted into the operation arm (21) to form a rotational fulcrum in cooperation with the shaft pillar (26) to position the operation arm (21) in a closed position, the set position being intermediate the open position and the closed position.

20. The complex moving and rotating pivot shaft device as claimed in claim 12, wherein when the operation arm (21) is displaced to an open position, the first end (27a) of the reciprocally-movable bolt (27) is positioned in the fixing seat (10), while the second end (27b) abuts against the sidewall (21b) of the operation arm (21), whereby the first guide section (22) of the operation arm (21) is relatively movable along the guiding section (28) of the bridge unit (25) so that the operation arm (21) moves from the open position to the set position around a virtual axis, the first end (27a) of the reciprocally-movable bolt (27) being displaceable from the fixing seat (10) and the second end (27b) being inserted into the operation arm (21) to form a rotational fulcrum in cooperation with the shaft pillar (26) to position the operation arm (21) in a closed position, the set position being intermediate the open position and the closed position.

* * * * *